(12) United States Patent
Valente

(10) Patent No.: US 6,367,661 B1
(45) Date of Patent: Apr. 9, 2002

(54) CUP CAKE HOPPER

(76) Inventor: Vincent Valente, 16 Hill St., Floral Park, NY (US) 11001

( * ) Notice: Subject to any disclaimer, the term of this patent is extended or adjusted under 35 U.S.C. 154(b) by 0 days.

(21) Appl. No.: 09/611,280

(22) Filed: Jul. 6, 2000

(51) Int. Cl.[7] .................................................. B67D 5/06
(52) U.S. Cl. ..................... 222/181.2; 222/460; 222/469; 222/471; 222/561
(58) Field of Search ............................. 222/181.2, 460, 222/469–471, 517, 559, 561

(56) References Cited

U.S. PATENT DOCUMENTS

| | | | |
|---|---|---|---|
| 3,643,704 A | * 2/1972 | Carr | 222/561 |
| 4,054,086 A | 10/1977 | McNair | 99/374 |
| 4,066,797 A | 1/1978 | McNair | 426/307 |
| 4,094,623 A | 6/1978 | Nelson | 425/227 |
| 4,175,483 A | 11/1979 | Clark | 99/354 |
| 4,201,358 A | 5/1980 | Nelson | 248/283 |
| 4,442,131 A | 4/1984 | Nagy et al. | 426/518 |
| 5,007,819 A | 4/1991 | Anderson | 425/184 |
| 5,289,945 A | * 3/1994 | Stradder | 222/561 |
| 5,513,777 A | * 5/1996 | Yoda et al. | 2122/561 |
| 5,620,114 A | * 4/1997 | Chalfa, Jr. | 222/561 |
| 5,687,640 A | 11/1997 | Sala | 99/423 |

* cited by examiner

Primary Examiner—Joseph A. Kaufman
(74) Attorney, Agent, or Firm—Michael I Kroll

(57) ABSTRACT

The present invention 10 discloses a main housing 28 having a slide track 30 with slide plate 22 attached above the interior orifice 32 of the release spout 24. Riding within the slide track 30 is a slide plate 22 controlled and operated by an external spring handle 26. The spring handle 26 consists of a pin 20 and lock device 40 in which the removable slide plate 22 is held captive. When the spring handle 26 is squeezed, the removable slide plate 22 is extracted from blocking the interior spout hole 32 allowing the batter to be released and then the spring handle pushes the slide plate back, riding within the track 30, in a closed position over the interior spout hole blocking the flow of the batter. The main housing 28 has a sanitary lid 16 that provides access to the interior of the housing to fill or for cleaning. Mounted to the exterior of the main housing are two stand adapters 18 which provide for attaching a four legged stand 44. The stand 44 snaps into the stand adapter 18 raising the main housing 28. The stand 44 has rubber caps 48 that fit over the end of its legs 46 thereby preventing sliding. The main housing 28 also has a removable spout 24 having mating threads 36, 38 allowing attachment to the main housing.

13 Claims, 9 Drawing Sheets

CUP CAKE HOPPER

BACKGROUND OF THE INVENTION

1. Field of the Invention

The present invention relates generally to a dough dispenser for cup cake batter and more specifically to cup cake, pan cake and chocolate lolly pop dispensers. The device of the present invention consists of a main housing. Within the main housing, a slide track is attached above the interior orifice of the release spout. Riding within the slide track is a slide plate. The slide plate is controlled and operated by an external spring handle. The spring handle consists of a pin and lock device in which a removable slide plate is held captive. When the spring handle is squeezed back, the removable slide plate is extracted from blocking the interior spout hole allowing the batter to be released, the spring handle pushes the slide plate back, riding within the track, in a closed position over the interior spout hole blocking the flow of the batter. The slide plate may be removed for cleaning by removing the pin from the locking device and slide plate. The main housing also consists of a sanitary lid that provides access to the interior of the housing to fill or for cleaning. Mounted to the exterior of the main housing are two stand adapters. The stand adapters provide a means of adapting a four legged stand. The stand snaps into the stand adapter raising the main housing. The stand consists of rubber caps that fit over the feet of the stand, preventing sliding from happening. The main housing also consists of a removable spout that clockwise screws into the main housing and counter clockwise to remove. The advantages of the present invention are time saved in preparation and clean up, less mess and easy usage.

2. Description of the Prior Art

There are other dough dispensers. Typical of these is U.S. Pat. No. 5,007,819 issued to Edward M. Anderson on Apr. 16, 1991.

Another patent was issued to Alex J. Nagy et al. on Aug. 10, 1984 as U.S. Pat. No. 4,442,131. Yet another U.S. Pat. No. 5,687,640 was issued to Andre Sala on Nov. 18, 1997 and still yet another was issued on May 6, 1980 to Jacob T. Nelson as U.S. Pat. No. 4,201,358

Another patent was issued to Jacob T. Nelson on Jun. 13, 1998 as U.S. Pat. No. 4,094,623. Yet another U.S. Pat. No. 4,175,483 was issued to Robert H. Clark on Nov. 27, 1979. Another was issued to Samuel L. McNair on Oct. 18, 1977 as U.S. Pat. No. 4,054,086 and still yet another was issued on Jan. 3, 1978 to Samuel L. McNair et al. as U.S. Pat. No. 4,066,797.

U.S. Pat. No. 5,007,819

Inventor: Edward M. Anderson

Issued: Apr. 16, 1991

A dough dispenser for donuts, donut holes, fritters and so forth has a frame and a dispensing hopper with a novel quick change hopper lock, a novel piston and adjustable dispensing valve for donut holes, and a novel structure for quick change of different sets of dispensing pistons and cutter dies.

U.S. Pat. No. 4,442,131

Inventor: Alex J. Nagy

Issued: Apr. 10, 1984

A machine for extruding and cutting yeast raised dough for making solid donuts or Bismarck is described herein which employs a discharge tube angled from the horizontal and changes within the discharge tube and to the discharge tube outlet in order to create a circular donut or other desired shape.

U.S. Pat. No. 5,687,640

Inventor: Andre Sala

Issued: Nov. 18, 1997

A hot plate is mounted in an opening of a platform mounted on a work surface. An opening surrounds the hot plate to permit excess batter to be discharged into a drawer. A batter dispenser includes a container which is pivotally mounted on a vertical axle. The container is pivoted from the side over the center of the hot plate. A hand lever is depressed, raising a stopper, permitting batter to flow through an outlet onto the hot plate.

U.S. Pat. No. 4,201,358

Inventor: Jacob T. Nelson

Issued: May 6, 1980

A dough dispensing device and support is illustrated including a rotatable molding means having axially spaced dough receiving cavities formed therein with a stationary separator therebetween to facilitate rapid dispensing of molded dough configurations. A support for the dough dispenser has a pair of pivotal confections between the dough dispenser and the stationary support surface so that the dough dispenser may be maneuvered upwardly for cleaning the side of a cooking compartment to which the dough is to be dispensed and subsequently pivoted to a lowered position closely above the surface of the medium contained in the cooking compartment for safely and rapidly dispensing a plurality of dough masses without splashing the cooking medium.

U.S. Pat. No. 4,094,623

Inventor: Jacob T. Nelson

Issued: Jun. 13, 1978

A dough dispensing device and support is illustrated including a rotatable molding means having axially spaced dough receiving cavities formed therein with a stationary separator therebetween to facilitate rapid dispensing of molded dough configuration. A support for the dough dispenser has a pair of pivotal connection between the dough dispenser and the stationary support surface so that the dough dispenser may be maneuvered upwardly for cleaning the side of a cooking compartment to which the dough is to be dispensed and subsequently pivoted to a lowered position closely above the surface of the cooking medium contained in the cooking compartment for safely and rapidly dispensing a plurality of dough masses without splashing the cooking medium.

U.S. Pat. No. 4,175,483

Inventor: Robert H. Clark

Issued: Nov. 27, 1979

A donut making appliance includes upper and lower electrically heated grids movable into and out of mating engagement along first surfaces. Each of the first surfaces of the grids includes a predeterminedly placed annular recess having a central core. Upon bringing the grids into engagement, the recesses are aligned to define a toroidally shaped cavity in which cake or the like batter is placed for baking donut shaped cakes. The central core of the lower grid defines a well preferably having the shape of a truncated cone, open at the first surface of the grid. The central core of the upper grid comprises a plunger having a shape complementary to that of the well and extending outwardly from the first surface of the grid, for receipt in the well upon engagement of the grids. The plunger-well arrangement ensures the alignment of the recesses and the displacement of cooking oil deposited in the well upon bringing the grids into engagement. The cooking oil is displaced from the well upon receipt of the plunger therein, thereby covering the cake batter with oil to produce a finished crust on the donuts upon baking.

U.S. Pat. No. 4,054,086

Inventor: Samuel L. McNair

Issued: Oct. 18, 1977

A donut maker for home use is disclosed which provides perfectly cooked and formed donuts having excellent taste and appearance characteristics notwithstanding the complete elimination of conventional deep fat frying of the donuts. The preferred device includes a base and openable lid section each having a pair of annular metallic concave walls disposed for cooperatively defining a pair of enclosed donut-shaped cooking chambers, along with a heating element for heating quantities of donut batter confined within the chambers; two corresponding sets of oil flow apertures are provided in the lid for allowing flow of cooking oil into the chambers during heating of the batter, in order to give the finished donut products a desirable crust and true donut flavor. In preferred donut-making procedures, cooking oil is introduced into the chamber during initial stages of cooking, whereupon the oil and cooking-generated steam are displaced from the chamber as the batter cooks and rises. During the final stages of cooking the oil is allowed to reenter the chamber through the apertures and be absorbed by the donuts, and this occurrence signals the end of the cooking cycle, so that perfectly cooked donuts are assured.

U.S. Pat. No. 4,066,797

Inventor: Samuel L. McNair

Issued: Jan. 3, 1978

A donut maker for home use is disclosed which provides perfectly cooked and formed donuts having excellent taste and appearance characteristics notwithstanding the complete elimination of conventional deep fat frying of the donuts. The preferred device includes a base and openable lid section each having a pair of annular metallic concave walls disposed for cooperatively defining a pair of enclosed donut-shaped cooking chambers, along with a heating element for heating quantities of donut batter confined within the chambers; two corresponding sets of oil flow apertures are provided in the lid for allowing flow of cooking oil into the chambers during heating of the batter, in order to give the finished donut products a desirable crust and true donut flavor. In preferred donut-making procedures, cooking oil is introduced into the chamber during initial stages of cooking, whereupon the oil and cooking-generated steam are displaced from the chamber as the batter cooks and rises. During the final stages of cooking the oil is allowed to reenter the chamber through the apertures and be absorbed by the donuts, and this occurrence signals the end of the cooking cycle, so that perfectly cooked donuts are assured.

While these dough dispensing devices may be suitable for the purposes for which they were designed, they would not be as suitable for the purposes of the present invention, as hereinafter described. It is thus desirable to provide a cup cake, pan cake and lolly pop batter dispenser that is easy to clean and operate with removable parts rendering the task of cleaning simple and easy. It is also further desirable to provide a dispensing device that is versatile in its usage for different batters.

SUMMARY OF THE PRESENT INVENTION

The present invention discloses a main housing having a slide track with slide plate attached above the interior orifice of the release spout. Riding within the slide track is a slide plate controlled and operated by an external spring handle. The spring handle consists of a pin and lock device in which the removable slide plate is held captive. When the spring handle is squeezed, the removable slide plate is extracted from blocking the interior spout hole allowing the batter to be released and then the spring handle pushes the slide plate back, riding within the track, in a closed position over the interior spout hole blocking the flow of the batter. The main housing also has a sanitary lid that provides access to the interior of the housing to fill or for cleaning. Mounted to the exterior of the main housing are two stand adapters which provide a means of attaching a four legged stand. The stand snaps into the stand adapter raising the main housing. The stand has rubber caps that fit over the end of the legs of the stand thereby preventing sliding. The main housing also has a removable spout having mating threads allowing attachment to the main housing.

A primary object of the present invention is to provide a cup cake, pan cake and chocolate lolly pop dispenser.

Another object of the present invention is to provide a cup cake, pan cake and chocolate lolly pop dispenser in which is easy cleaned and assembled, and versatile in function.

Yet another object of the present invention is to provide a dough dispensing device consisting a main housing, a sanitary lid and spring handle.

Still yet another object of the present invention is to provide a dough dispensing device in which operates by squeezing a spring operated handle causing a slide plate to retract along a captive track from an interior opening allowing batter to disperse through the removable spout.

Additional objects of the present invention will appear as the description proceeds.

The present invention overcomes the shortcomings of the prior art by providing a cup cake, pan cake and chocolate lolly pop dispenser that is easy to clean and operate with removable parts rendering the task of cleaning simple and easy.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
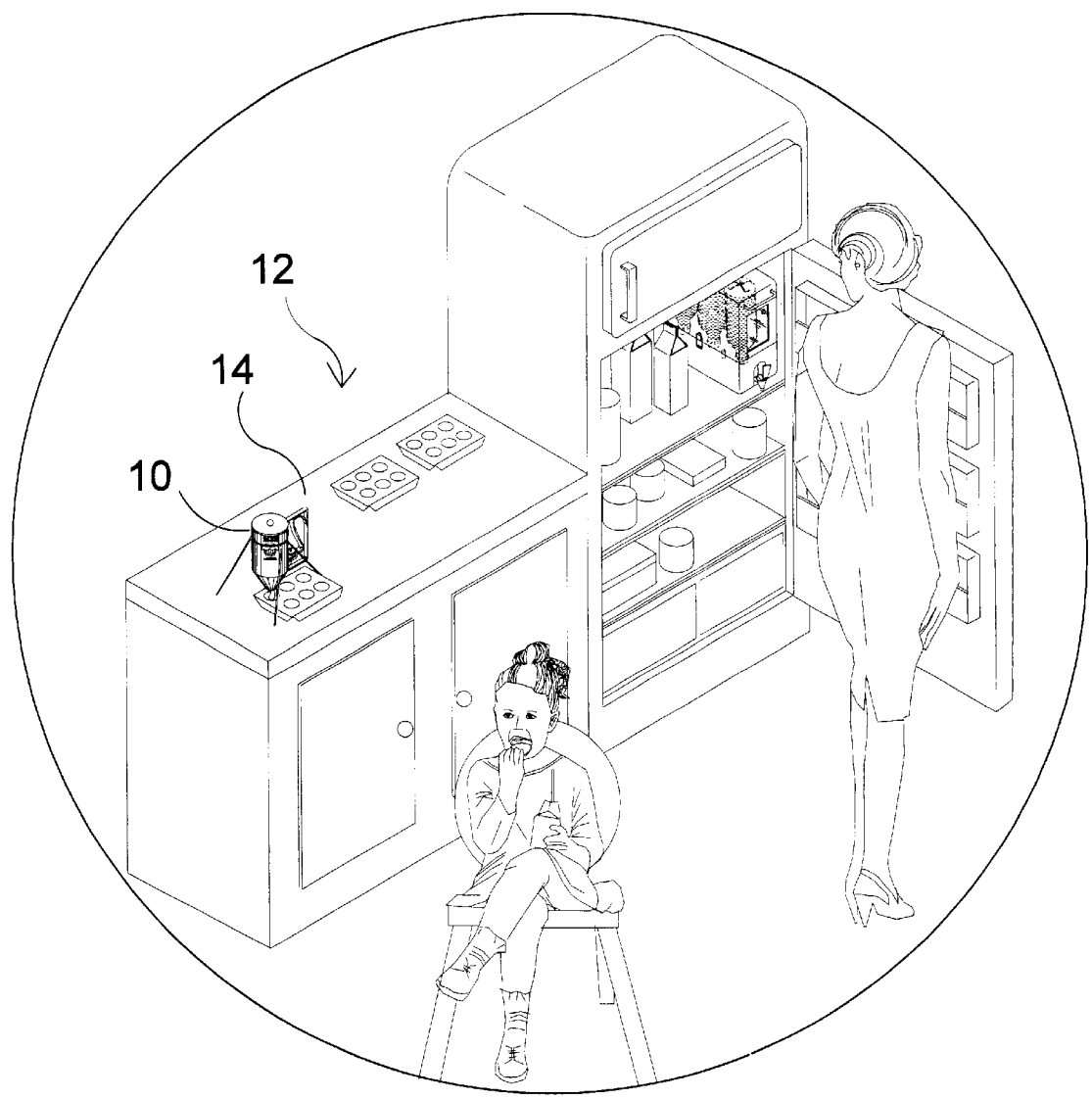
FIG. 1 is a pictorial view depicting a typical kitchen set up. Displayed on the counter top is the dispenser of the present invention.

With regard reference numerals used, the following numbering is used throughout the drawings.
10 present invention
12 kitchen
14 counter top
16 lid
18 stand adapter
20 pin
22 slide plate
24 spout
26 spring handle
28 housing
30 track
32 dispensing inner hole
34 spout outer hole
36 threads
38 threads
40 spring handle assembly
42 spring handle attachment piece
44 stand
46 stand legs
48 feet
50 lid knob
52 aperture
54 arms
56 aperture
58 handle frame

DESCRIPTION OF THE PREFERRED EMBODIMENT(S)

In order that the invention may be more fully understood, it will now be described, by way of example, with reference to the accompanying drawings in which FIGS. 1 through 9 illustrate the present invention being an edible dough hopper for food items.

Turning to FIG. 1, shown therein is a pictorial view depicting a typical kitchen set up 12. Displayed on the counter top 14 is the present invention 10.

Figure 2:
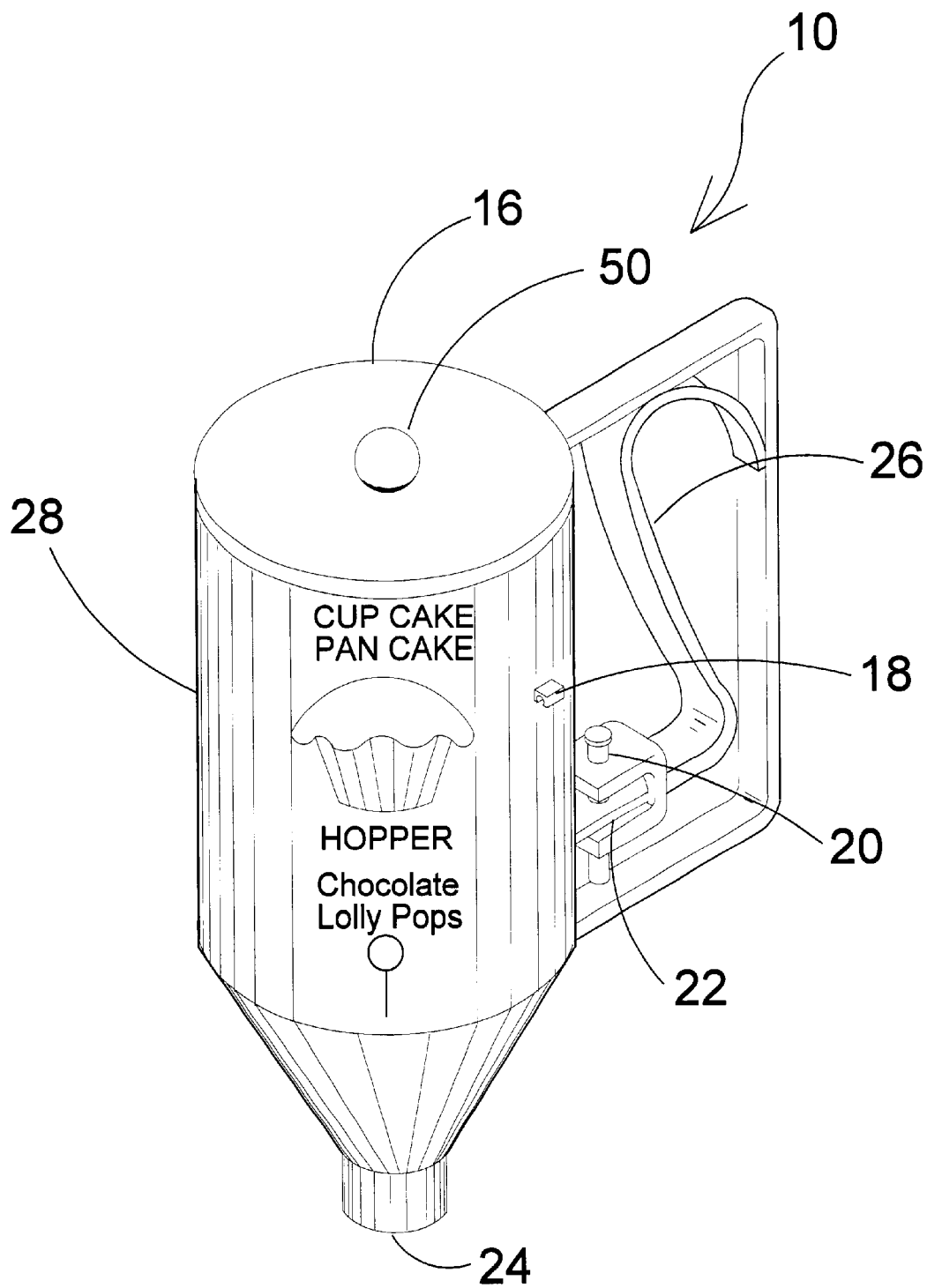
FIG. 2 is a perspective view of the present invention. Shown in an assembled view are the exterior components that make up the dispenser, the sanitary lid, stand adapter, removable pin, slide plate, and removable spout.

Turning to FIG. 2, shown therein is a perspective view of the present invention 10. Shown in an assembled view are the exterior components that make up the dispenser, including the sanitary lid 16 with knob 50, stand adapter 18, removable pin 20, slide plate 22, removable spout 24 and spring handle 26 and housing 28.

Figure 3:
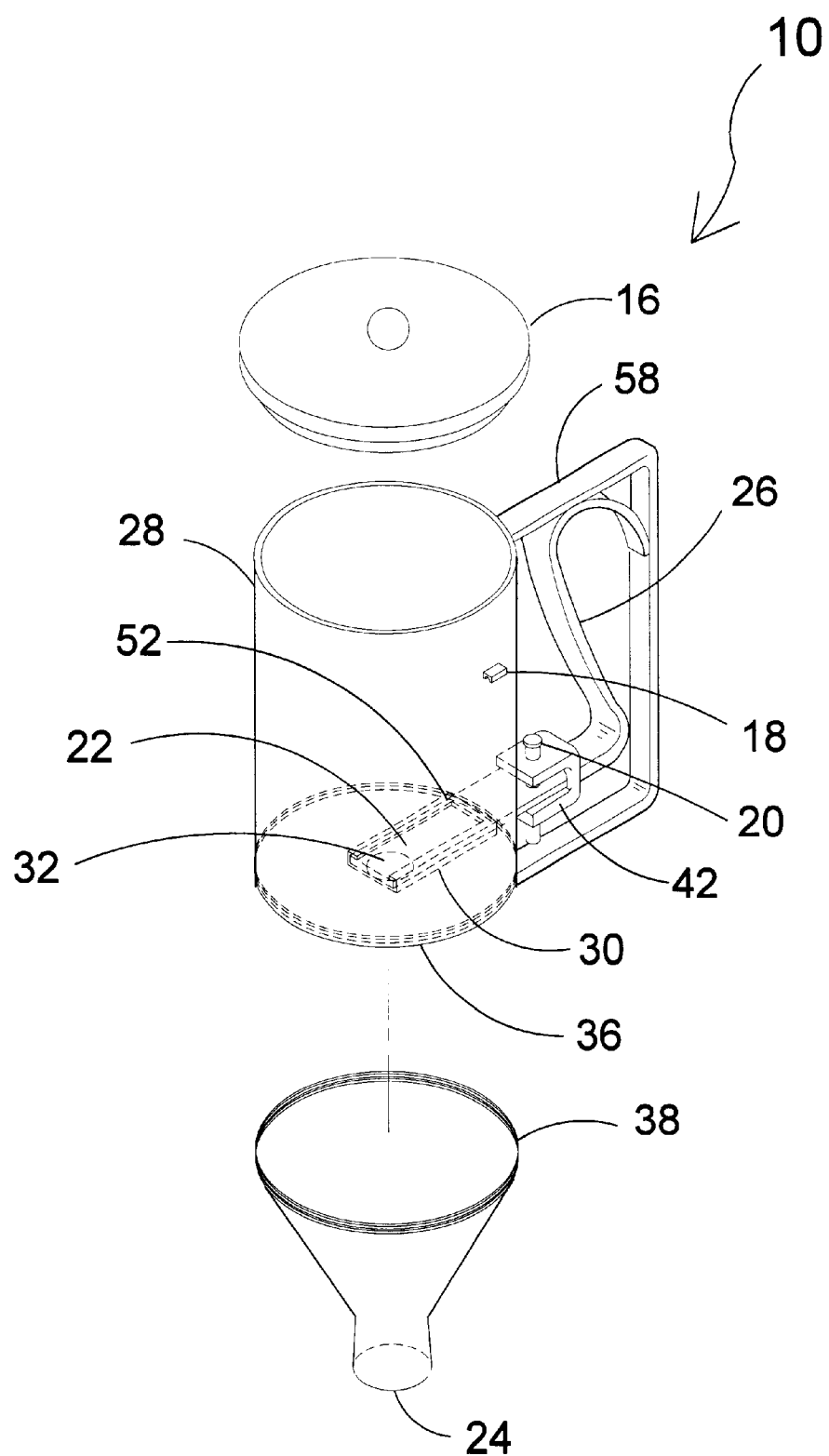
FIG. 3 is an exploded view of the present invention showing the spring handle in the relaxed position. The slide plate in its track and covering the inner dispensing hole. The sanitary lid is shown removed and the lower spout also removed.

Turning to FIG. 3, shown therein is an exploded view of the present invention 10 showing the spring handle 26 in the relaxed position and the slide plate 22 in its track 30 and covering the inner dispensing hole 32. The sanitary lid 16 is shown removed and the lower spout 34 also removed. Also shown are the upstanding cylindrical-like hopper housing 28, pin 20, stand adapter 18 and mating threads 36, 38 for attaching the funnel-like spout 34 to housing 28. The present invention 10 discloses a main housing 28 having an aperture 52 in its side wall for receiving a slide track 30 attached above the interior orifice 32 of the release spout 24. Slide track 30 is disposed perpendicular to the side wall extending toward the centerline of the housing 28. Riding within the slide track 30 is a slide plate 22 controlled and operated by a one piece external spring handle 26 mounted inside a rigid fixedly attached handle frame 58. The spring handle 26 consists of a pin 20 and lock device 42 in which the removable slide plate 22 is held captive. When the spring handle 26 is squeezed backwardly away from housing 28, the removable slide plate 22 is moved from blocking the interior spout hole 32 allowing the batter to be released and then when released the spring handle pushes the slide plate back, riding within the track 30, in a closed position over the interior spout hole blocking the flow of the batter. The main housing 28 also has a sanitary lid 16 that provides access to the interior of the housing to fill or for cleaning. Mounted to the exterior and on opposing sides of the main housing are two stand adapters 18 which provide a means of attaching a four legged stand 44 (not shown but see FIG. 6). The main housing 28 also has a removable spout 24 having mating threads 36, 38 that clockwise screws into the main housing and screws counter clockwise to be removed.

Figure 4:
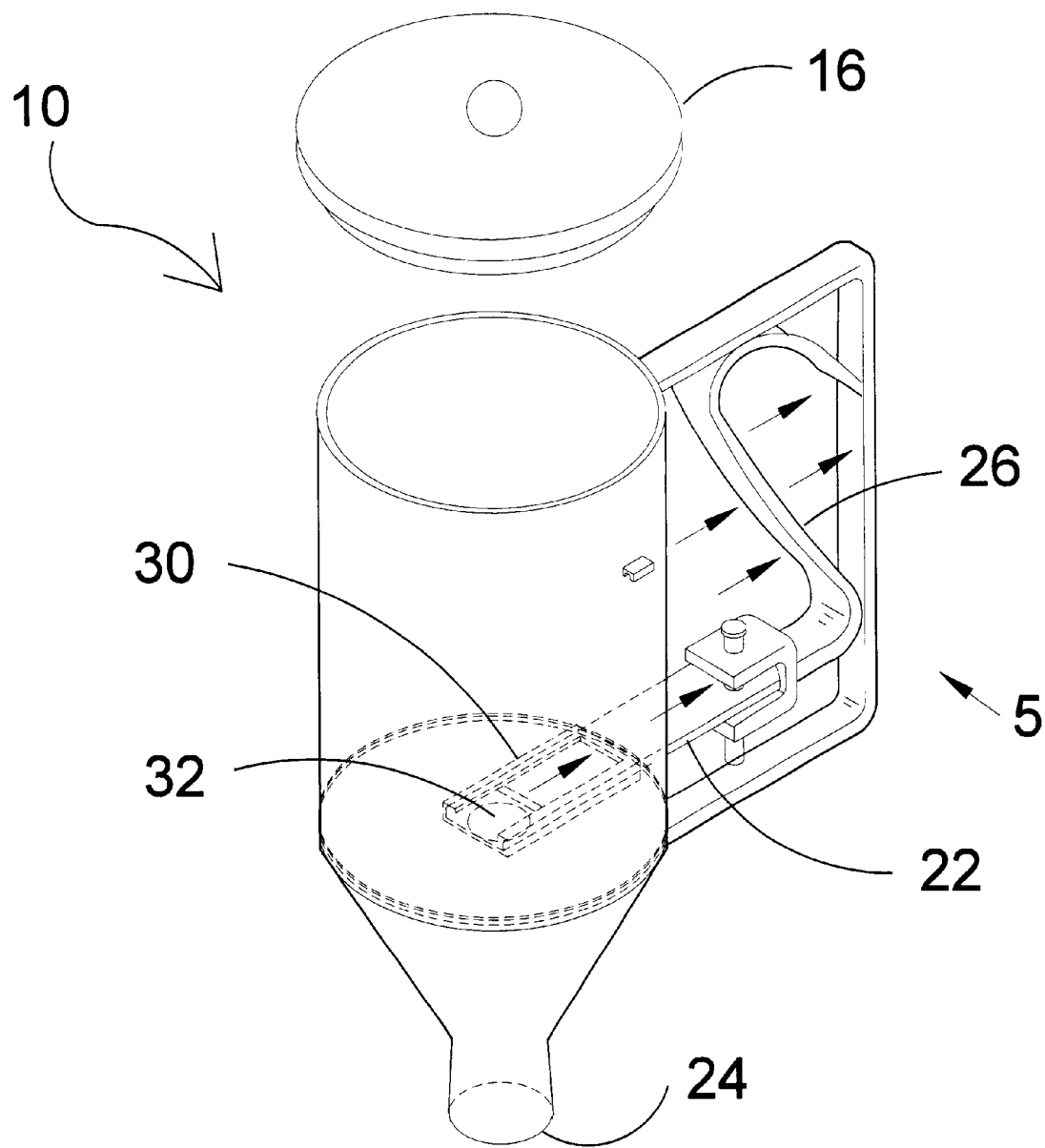
FIG. 4 is a perspective view of the present invention showing the spring handle in a squeezed position, retracting the slide plate within the slide track away from the inner spout opening. This allows the dough to disperse freely.

Turning to FIG. 4, shown therein is a perspective view of the present invention 10 showing the lid 16, and the spring handle 26 in a squeezed position, retracting the slide plate 22 within the slide track 30 away from the inner spout opening 32. This allows the dough to dispense freely through spout 24.

Figure 5:
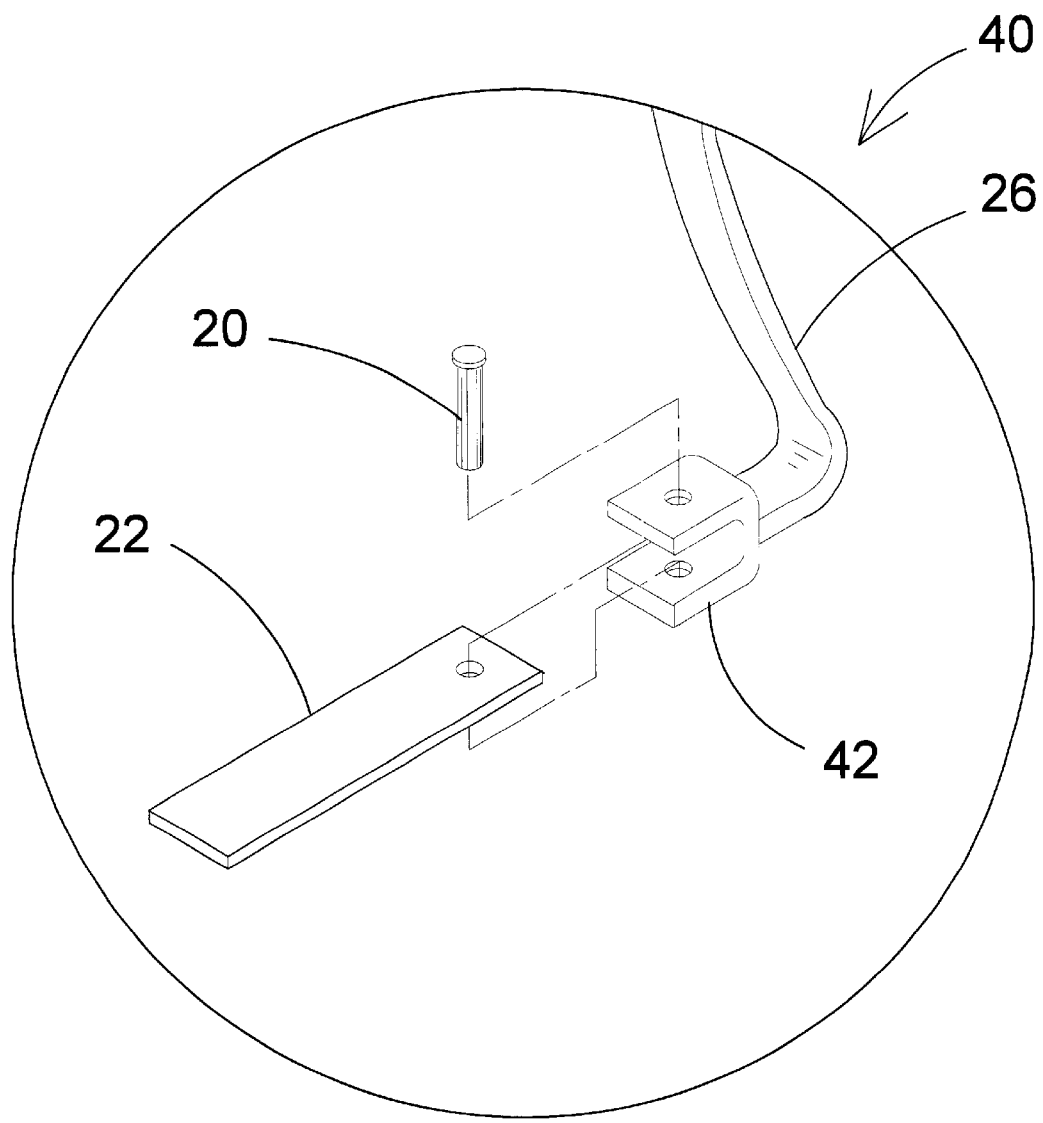
FIG. 5 is a detail view of the present inventions spring handle assembly. Shown is the slide plate pin, the slide plate and the spring handle attachment piece located at the tail of the spring handle.

Turning to FIG. 5, shown therein is a detail view of the present inventions spring handle assembly 40. Shown are the slide plate pin 20, the slide plate 22 and the spring handle attachment piece 42 for attaching the slide plate located at the tail of the spring handle 26.

Figure 6:
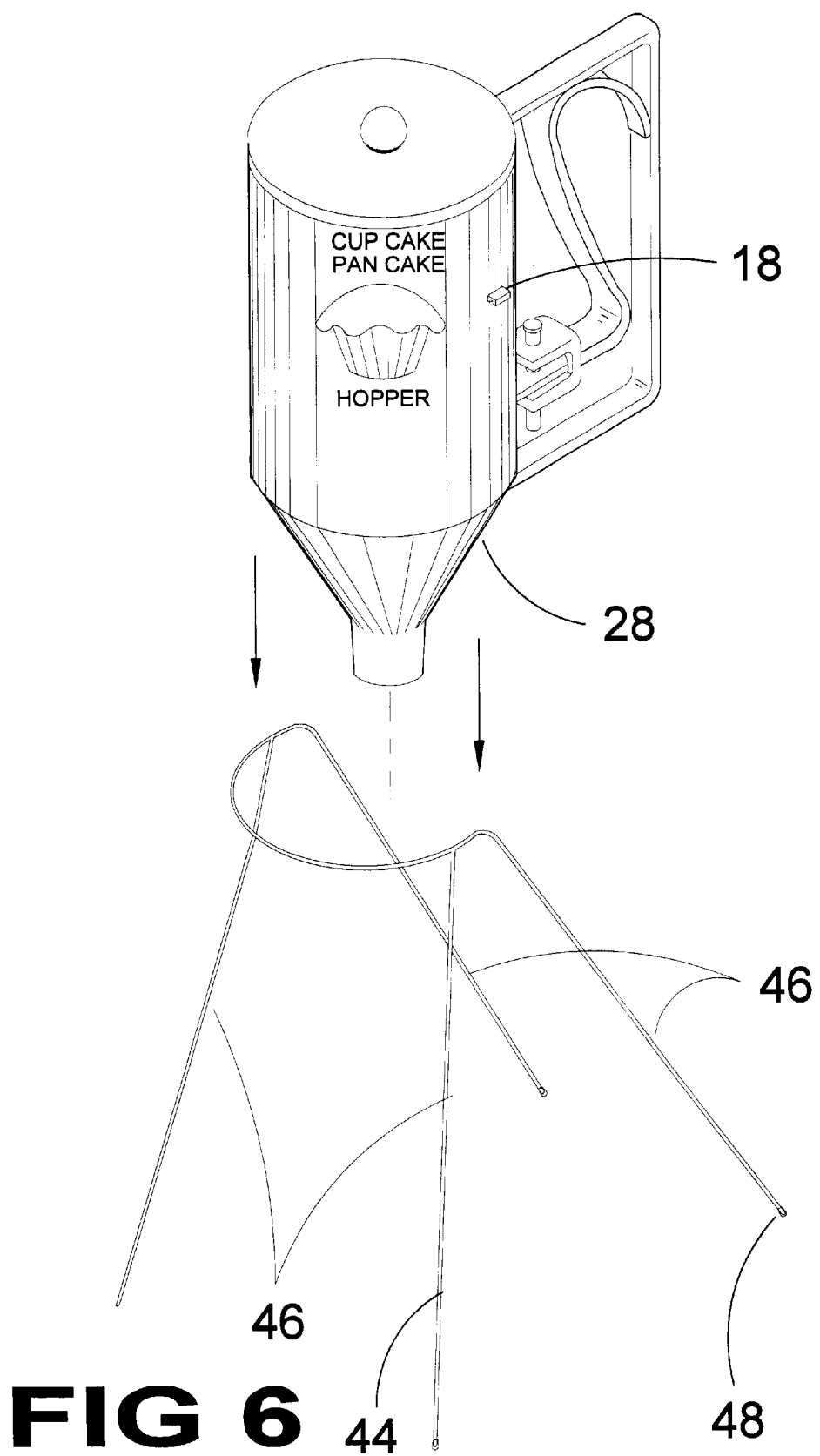
FIG. 6 is a perspective view of the present invention depicting the stand of the present invention and the dispenser. The dispenser has two stand adapters that are mounted to the stand and snapped into position. The stand consists of a metal wire like frame with four legs. All four legs consist of rubber feet attached to the bottom of the feet of the stand.

Turning to FIG. 6, shown therein is a perspective view of the present invention 10 depicting the stand 44 of the present invention 10 and its housing 28. The dispenser housing 28 has two stand adapters 18 that are mounted to the stand 44 and snapped into position. The stand 44 consists of a metal wire like frame with four legs 46. All four legs 46 have rubber feet 48 attached to the bottom of the legs 46.

Figure 7:
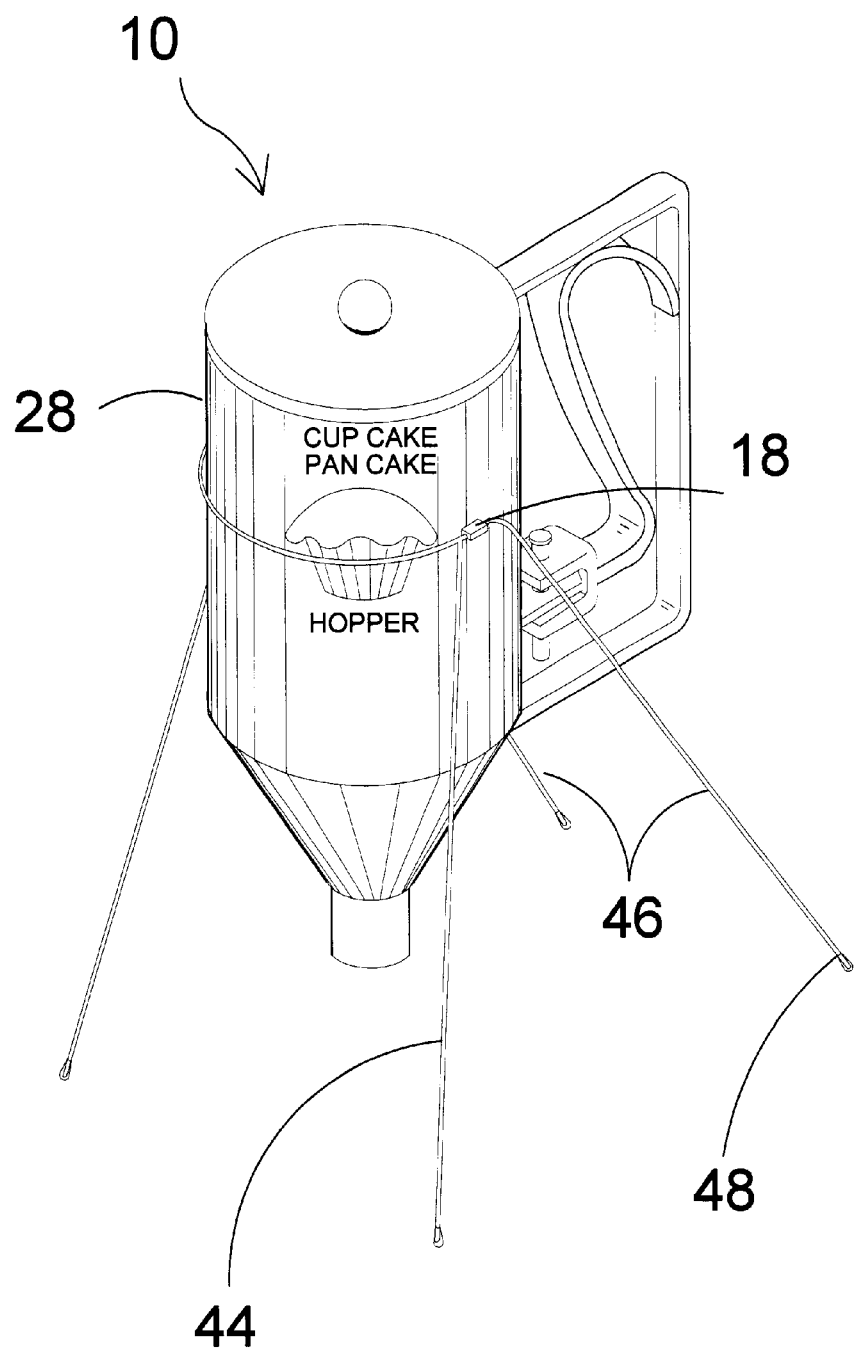
FIG. 7 is a perspective view of the present invention showing the dispenser mounted to the stand by means of stand adapters which hold the dispenser in place. The legs of the stand have rubber feet attached to them to provide a non-slips effect.

Turning to FIG. 7, shown therein is a perspective view of the present invention 10 showing the dispenser housing 28 mounted to the stand 44 by means of stand adapters 18 which hold the dispenser in place. The legs 46 of the stand have rubber feet 48 attached to them to provide a non-slip effect.

Figure 8:
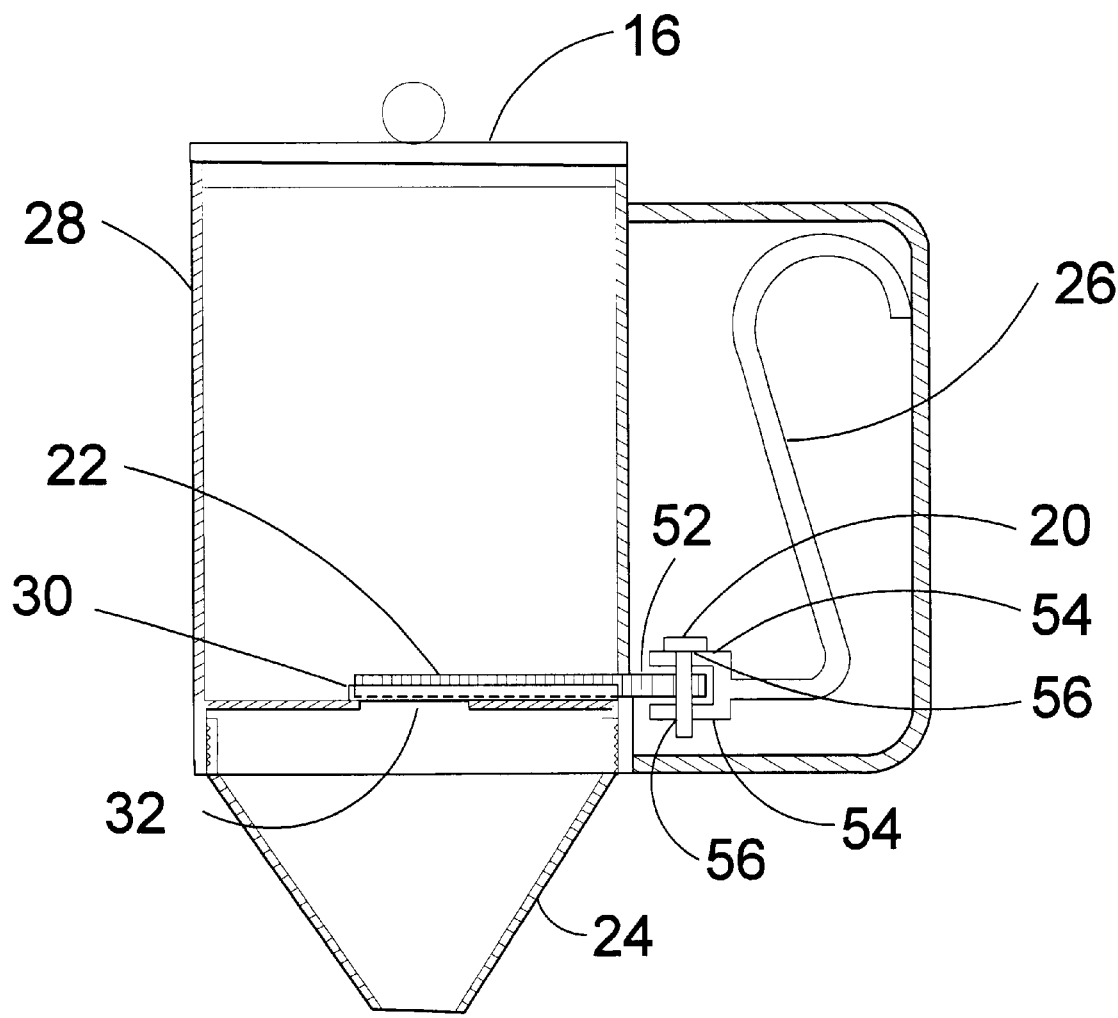
FIG. 8 is a sectional view of the present invention in an assembled state showing the spring handle in the relaxed position with slide plate covering the inside spout hole. The sanitary lid and removable spout shown attached to the main housing of the device.

Turning to FIG. 8, shown therein is a sectional view of the present invention 10 in an assembled state showing the spring handle 26 in the relaxed position with slide plate 22 covering the inside spout hole 32. The sanitary lid 16 and removable spout 24 are shown attached to the main housing 28 of the device. Also shown are the pin 20 and track 30 and aperture 52. Also shown are a pair of arms 54 having mating, operatively aligned apertures 56 for receiving pin 20 therebetween.

Figure 9:
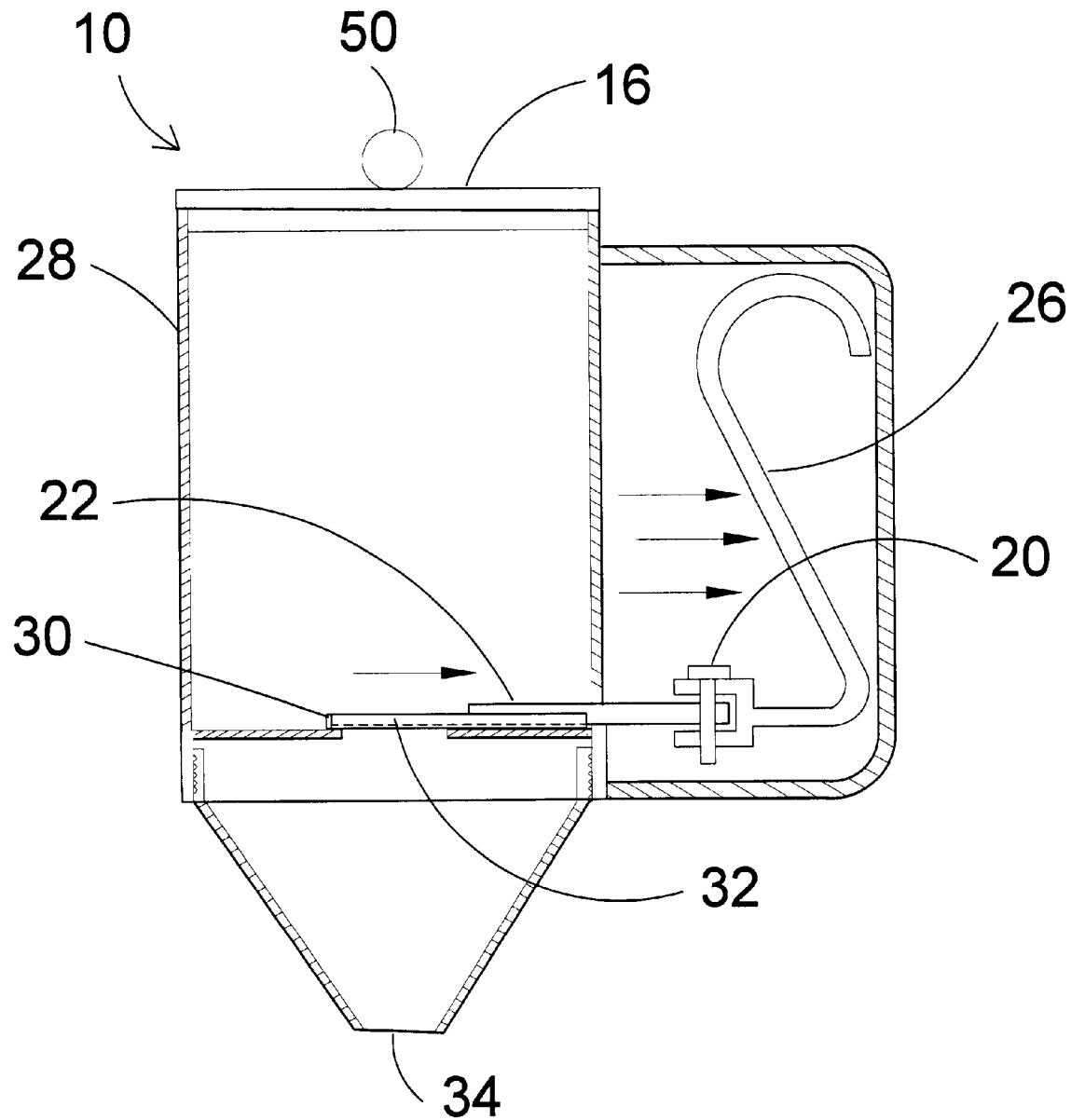
FIG. 9 is a sectional view of the present invention showing the spring handle in a squeezed position and the slide plate riding within the slide track retracted away from the inside spout opening. The spout opening is know clear for dough to be dispersed.

Turning to FIG. 9, shown therein is a sectional view of the present invention 10 showing the spring handle 26 in a squeezed position and the slide plate 22 riding within the slide track 30 retracted away from the inside spout opening 32. The spout opening 34 is now clear for dough to be dispensed. Also shown are the housing 28, lid 16 with knob 50 and pin 20.

I claim:

1. An apparatus for dispensing dough for edible items such as cookies, comprising:
   a) an upright standing, cylindrically shaped housing open on the top end and the bottom end, said housing having an aperture in its sidewall;
   b) a slide track disposed in operative alignment with said aperture, said track disposed perpendicular to said side wall of said housing, said track extending toward the center of said housing, said track having an aperture therein through which dough passes;
   c) a slide plate slidably disposed in said slide track, said plate having a first end and a second end;
   d) a movable handle disposed on the exterior of said sidewall of said housing, said handle in operative alignment with said slide plate, said handle for being gripped by a user, said handle having an upper end and a lower end, and said movable handle being a one-piece resilient member; and,
   e) means for removably connecting said handle to said first end of said slide plate whereby said slide plate slides in said track in response to said handle being moved by the hand of the user.

2. The apparatus of claim 1, further comprising a removable lid disposed on said top end of said housing.

3. The apparatus of claim 2, said lid further comprising a knob disposed thereon for being gripped by the user.

4. The apparatus of claim 1, further comprising a discharge spout disposed on the bottom end of said housing, said spout having an upper end and a lower end, said spout having a hole therein, said hole disposed in its lower end for discharge of dough.

5. The apparatus of claim 4, wherein said spout is shaped like a funnel.

6. The apparatus of claim 5, further comprising means for attaching said spout to said housing whereby said spout is removable.

7. The apparatus of claim 6, wherein said means for attaching further comprises mating threads disposed on the bottom end of said housing and the upper end of said spout.

8. The apparatus of claim 4, wherein said aperture of said slide track is operatively aligned with said discharge hole in said lower end of said spout.

9. The apparatus of claim 1, further comprising a rigid handle frame fixedly attached to said housing within which said movable handle operates.

10. An apparatus for dispensing dough for edible items such as cookies, comprising:
    a) an upright standing, cylindrically shaped housing open on the top end and the bottom end, said housing having an aperture in its sidewall;
    b) a slide track disposed in operative alignment with said aperture, said track disposed perpendicular to said side wall of said housing, said track extending toward the center of said housing, said track having an aperture therein through which dough passes;
    c) a slide plate slidably disposed in said slide track, said plate having a first end and a second end;
    d) a movable handle disposed on the exterior of said sidewall of said housing, said handle in operative alignment with said slide plate, said handle for being gripped by a user, said handle having an upper end and a lower end; and,
    e) means for removably connecting said handle to said first end of said slide plate whereby said slide plate slides in said track in response to said handle being moved by the hand of the user, said means for removable connection being disposed on said lower end of said handle and further comprises a pair of arms disposed on said lower end of said handle, each of said arms having a mating aperture therein, said pair of apertures being in operative alignment with each other.

11. The apparatus of claim 10, further comprising a removable pin for attachment of said slide plate to said handle.

12. The apparatus of claim 11, wherein said mating apertures on said arms of said handle receive said removable pin.

13. The apparatus of claim 12, wherein said first end of said slide plate has an aperture therein.

* * * * *